United States Patent
Biest et al.

(10) Patent No.: US 8,590,843 B2
(45) Date of Patent: Nov. 26, 2013

(54) CYCLIC STICK FOR MECHANICALLY TRANSMITTING COMMANDS FOR CONTROLLING A ROTORCRAFT, THE STICK HAVING A LEVER ARM THAT IS AMPLIFIED SELECTIVELY IN THE EVENT OF AN EMERGENCY

(75) Inventors: Romuald Biest, Lauris (FR); Robert Convers, Wunoux (FR)

(73) Assignee: Eurocopter, Marignane Cedex (FR)

( * ) Notice: Subject to any disclaimer, the term of this patent is extended or adjusted under 35 U.S.C. 154(b) by 56 days.

(21) Appl. No.: 13/411,950

(22) Filed: Mar. 5, 2012

(65) Prior Publication Data
US 2012/0234985 A1 Sep. 20, 2012

(30) Foreign Application Priority Data
Mar. 18, 2011 (FR) .................................... 11 00820

(51) Int. Cl.
*B64C 13/04* (2006.01)
(52) U.S. Cl.
USPC ........................................ 244/234; 244/118.5
(58) Field of Classification Search
USPC ......................................................... 244/234
See application file for complete search history.

(56) References Cited

U.S. PATENT DOCUMENTS

| | | | |
|---|---|---|---|
| 3,209,612 A | | 10/1965 | Tonnies |
| 3,799,569 A | * | 3/1974 | Baker ........................... 280/775 |
| 4,012,014 A | * | 3/1977 | Marshall ....................... 244/234 |
| 4,527,444 A | * | 7/1985 | McKee et al. ................... 74/493 |
| 4,793,204 A | * | 12/1988 | Kubasiak ........................ 74/493 |
| 4,961,548 A | * | 10/1990 | Adams et al. ............... 244/118.5 |
| 5,900,710 A | | 5/1999 | Gautier |
| 6,254,037 B1 | | 7/2001 | Fenny |
| 6,357,317 B1 | * | 3/2002 | Livengood et al. ............. 74/493 |
| 6,357,318 B1 | * | 3/2002 | Koellisch et al. ............... 74/493 |
| 6,688,644 B2 | * | 2/2004 | Tsunoda et al. ............... 280/777 |
| 6,758,494 B2 | * | 7/2004 | Bannon et al. ................. 280/775 |
| 7,328,631 B2 | * | 2/2008 | Murakami et al. .............. 74/493 |
| 7,770,488 B2 | * | 8/2010 | Kim et al. ........................ 74/493 |
| 2006/0022446 A1 | * | 2/2006 | Murakami et al. ............ 280/775 |

(Continued)

FOREIGN PATENT DOCUMENTS

| | | |
|---|---|---|
| EP | 0844171 A1 | 5/1998 |
| EP | 1218240 A1 | 7/2002 |
| GB | 279206 A | 10/1927 |

OTHER PUBLICATIONS

Search Report and Written Opinion; Application No. FR 1100820; dated Oct. 21, 2011.

*Primary Examiner* — Christopher P Ellis
*Assistant Examiner* — Medhat Badawi
(74) *Attorney, Agent, or Firm* — Brooks Kushman P.C.

(57) ABSTRACT

The invention provides a control mechanism for controlling flight of an aircraft, the control mechanism comprising a cyclic control stick (1) that is mounted to tilt (B1, B2) on a carrier structure (4) and that is in engagement with remote mechanical transmission members (2, 3). The stick (1) is arranged as a telescopic member provided with locking means (20) for locking it in a normal-use retracted position, and is equipped with deployment means (21). Unlocking of the locking means (20) and use of the deployment means (21) depend on an assistance device (17) associated with the stick (1) being in a defective state. In the event of such a defective state being detected, the stick (1) is suitable for being deployed so as to increase the comfort of the pilot while manipulating it.

11 Claims, 2 Drawing Sheets

(56) References Cited

U.S. PATENT DOCUMENTS

2008/0011905 A1* 1/2008 Guering ............... 244/228
2008/0272243 A1 11/2008 Decker
2009/0283642 A1* 11/2009 Gemmati et al. ............ 244/178
2010/0123045 A1 5/2010 Grieser
2010/0308157 A1* 12/2010 Gemmati et al. .......... 244/17.25
2010/0308178 A1* 12/2010 Gemmati et al. ............ 244/230
2011/0024551 A1* 2/2011 Biest et al. ................... 244/6
2011/0163206 A1* 7/2011 Bandera ...................... 244/234

* cited by examiner

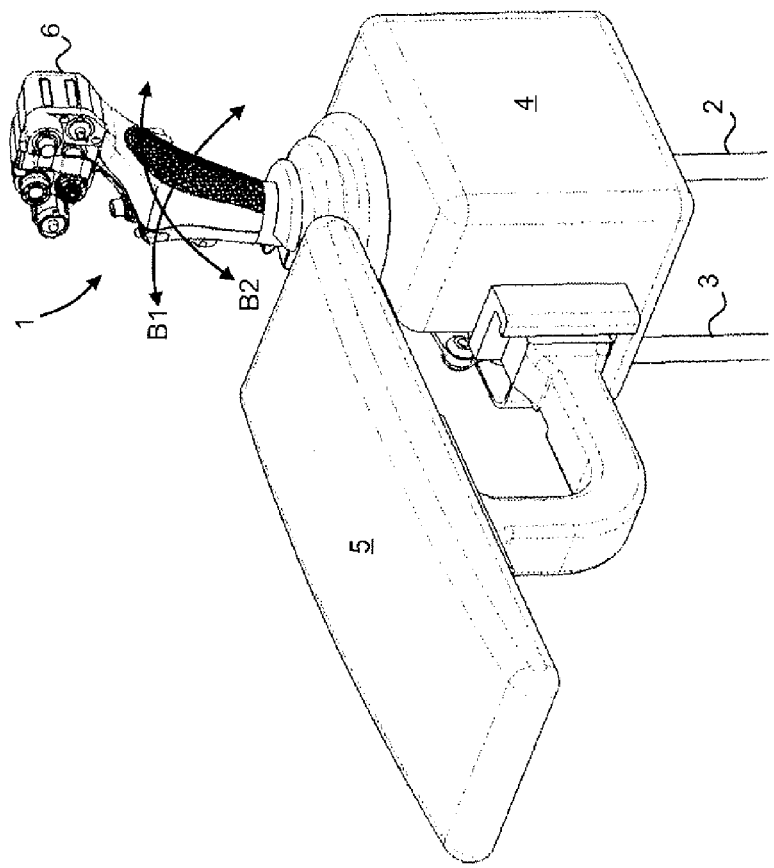
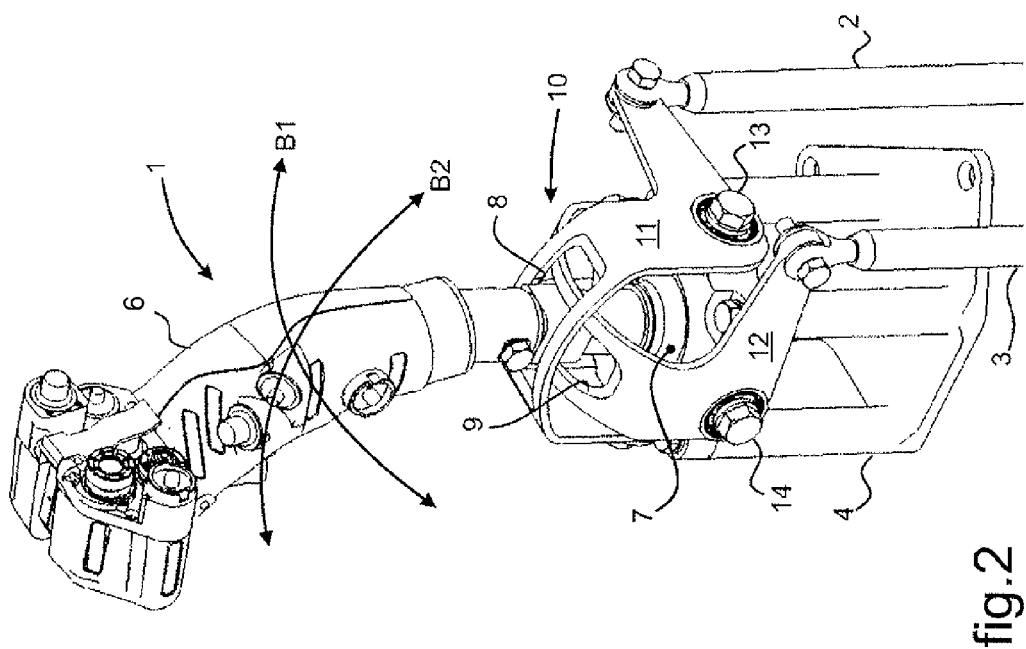

CYCLIC STICK FOR MECHANICALLY TRANSMITTING COMMANDS FOR CONTROLLING A ROTORCRAFT, THE STICK HAVING A LEVER ARM THAT IS AMPLIFIED SELECTIVELY IN THE EVENT OF AN EMERGENCY

CROSS REFERENCE TO RELATED APPLICATIONS

This application claims priority to FR 11 00820 filed on Mar. 18, 2011, the disclosure of which is incorporated in its entirety by reference herein.

BACKGROUND OF THE INVENTION (1) Field of the Invention

The present invention relates to the field of aircraft, and in particular to the field of rotorcraft, and it relates more particularly to command systems of transmissions that are actuated by a human for controlling the flight directions of an aircraft, and in particular in pitching and in roll. The invention relates more specifically to control sticks for controlling the flight directions of an aircraft, and in particular for changing the angle of incidence of the blades of a rotor equipping a rotorcraft. The invention relates, in particular, to a control stick for mechanically transmitting commands that is of structure axially short and suitable for being incorporated in the armrest of a pilot's seat.

(2) Description of Related Art

Rotorcraft are commonly equipped with manually operated control systems for enabling a pilot to control the rotorcraft. Among such control systems, a cyclic control lever enables the pilot to change the angle of incidence of the blades so as to control the rotorcraft on the basis of selective flight commands, respectively for pitching control and for roll control. The control lever is hinged to a frame, e.g. being arranged as a box or the like, while being mounted to tilt in at least two control directions that are assigned to respective flight commands. The control lever is in hinged engagement with the frame at a distal one of its ends, and is provided at its proximal other end with a grip that can be taken hold of by the pilot. The proximal end is the end of the control lever that can be manipulated by the pilot, the distal end being the end of the control lever that is opposite from the proximal end. As soon as the control lever is tilted in either of the control directions, a corresponding command transmission member is activated to bring into use a remote power-assisted member, in particular a hydraulic servo-control actuator, that is assigned to corresponding pitching or roll flight control. The transmission member may be of the mechanical type, by being arranged as a rod, as a link, as a ball-bearing sheath, as a cable, or as an analogous remote mechanical transmission member, or else said transmission member may be of the electrical type by being arranged as a contactor connected to the remote power-assisted member via a wire connection.

Among cyclic control levers, long cyclic columns are known that tend to be reserved for transmitting commands mechanically, and short cyclic sticks are known that tend to be reserved for transmitting commands electrically. By way of indication, the length of a long cyclic column is about three to four times the length of a short cyclic stick. A long cyclic column is hinged in front of the seat and offers the advantage of transmitting commands mechanically, which is less costly than transmitting commands electrically.

A cyclic column has a lever arm that is considerable, thereby facilitating mechanical transmission of commands, and making manipulation easy for the pilot. Pilots can use their entire arms for operating the cyclic column with appropriate force, and can feel directly the resistance forces opposed by the remote power-assisted members against being operated.

A cyclic stick, of small size, can be mounted in the armrest of a pilot's seat, so as to make control comfortable for the pilot sitting in the seat, with improved visibility and improved overall ergonomics for the cockpit, by releasing the space extending in front of the pilot sitting in the seat. The cyclic stick is easy to manipulate since it can be tilted effortlessly through small amplitudes and effortlessly by wrist actions of the pilot, with this being made possible by using electrical-type transmission means and by implementing an electromechanical force-simulation device that is servo-controlled to the remote power-assisted members so as to reproduce the resistance forces they oppose to being operated.

Ideally, a good compromise could be obtained by using a short cyclic stick suitable for incorporating in the armrest, and by equipping the stick with transmission members of the mechanical type. In order to mitigate the insufficient lever arm of the cyclic stick, a force-developing assistance device may be interposed in the transmission system between the cyclic stick and the remote power-assisted member. Unfortunately, that solution is not fully satisfactory as it stands, and needs improving. It is found that, in the event of malfunction of the assistance devices, the cyclic stick becomes difficult to use.

For information about a technological environment close to the present invention, reference can be made, for example, to Documents EP 0 844 171 (AEROSPATIALE) and US 2008/0272243 (DECKER W. E.) that describe flight control mechanisms for controlling flight of an aircraft that implement control sticks.

The teaching from the following documents is also known: EP 1 218 240 (BELL HELICOPTER TEXTRON INC) discloses the use of a device making it possible to modulate the relationships governing forces felt by the pilot on the pilot's control member. U.S. Pat. No. 4,961,548 (ROCKWELL INT CORP) discloses a console for supporting a control stick, which console is mounted telescopically on the floor of an aircraft. Document U.S. Pat. No. 3,209,612 (HAMBURGER FLUGZEUGBRAU GMBH) describes a column that is mounted to the floor of an aircraft so as to move longitudinally in order to procure flight control on the basis of its movement.

Document US 2010/0123045 presents a control mechanism provided with a column cooperating with a trim actuator.

Document GB 279 206 discloses a control mechanism for protecting a pilot from control means in the event of an accident.

BRIEF SUMMARY OF THE INVENTION

An object of the present invention is to propose a control mechanism for controlling the flight directions of an aircraft, and more particularly of a rotorcraft, on the basis of changing the angle of incidence of the blades of a rotor equipping the rotorcraft. More specifically, an object of the present invention is to propose such a control mechanism that includes a control stick, in particular, a cyclic control stick, and that makes it possible for the pilot to control the aircraft comfortably in an emergency situation in which at least one force-developing assistance device equipping the stick is defective.

The mechanism of the present invention is a control mechanism for controlling at least one flight direction of an aircraft, in particular of a rotorcraft, and more particularly a control mechanism for controlling at least one remote member to be operated via at least one remote mechanical transmission member. The remote member is, in particular, a power-assisted member driven by hydraulic energy or by electrical energy, for example, for operating a control surface of the aircraft, and more particularly the blades of a rotor equipping the rotorcraft so as to change the angle of incidence of said blades. The mechanical transmission member is of the type arranged as a link, as a rod, as a cable, or as some other analogous remote mechanical transmission member. The control mechanism comprises a control stick that is axially long and that is mounted at its distal end on a carrier structure to pivot about a hinge axis in a corresponding tilt orientation. In particular, this carrier structure includes a frame that is advantageously arranged as a box or as a similar member for mounting the stick in movable manner and for installing the stick in intermediate manner on the armrest of a pilot's seat equipping the aircraft.

The stick is then mounted on the carrier structure via at least one hinge member equipping said stick, the hinge member being inside a recess of complementary shape with which the carrier structure is provided.

The stick is arranged at its proximal end as a grip, so that it can be taken hold of by a pilot of the aircraft sitting in the pilot's seat in order to tilt the stick in at least one direction between a spontaneous rest position and a working position in which the stick actuates a remote member to be operated.

In addition, the stick is in engagement with at least one remote mechanical transmission member, so as to cause said mechanical transmission member to be operated as a result of the stick being tilted about said hinge axis. The mechanical transmission member is mechanically coupled to operate at least one remote member that is assigned to it.

The stick is equipped with at least one assistance device for assisting with moving said stick by means of force amplification, which assistance device is placed on the path along which forces are transmitted from the stick to the remote member to be operated. The assistance device is a device that generates force amplification on the basis of the forces developed by the stick on the transmission member in engagement with said stick, in order to mitigate the short lever-arm effect that said stick generates due to its short length that makes it reasonable to mount said stick on the armrest of a pilot's seat. In order to be reasonable, mounting the stick in such a manner should enable the stick to be operated comfortably by a pilot sitting in the pilot's seat and making use of wrist actions.

The stick is more particularly short while being suitable for incorporating in an armrest of a pilot's seat, via the carrier structure that is provided with means for installation on such an armrest. Between its ends, the stick is in engagement with the transmission member, and preferably closer to its distal end opposite from the proximal end that is provided with the grip. The stick is hinged to the carrier structure between its ends to pivot about a hinge axis in a corresponding tilt orientation, that is suitable for being placed as close as possible to its distal end so as to make maximum use of the lever arm that the stick procures between its proximal end and the point at which it is in hinged engagement with the carrier structure.

In a preferred variant embodiment, the distal end of the stick is in engagement with the transmission member while the stick is hinged to the carrier structure between its ends, preferably as close as possible to its distal end. In another variant embodiment, the stick is conversely suitable for being hinged to the carrier structure at its distal end and for being in engagement with the transmission member between its ends, preferably as close as possible to its distal end.

The stick is hinged to the carrier structure to pivot in at least one tilt orientation corresponding to a flight command. The stick is provided with said hinge member that co-operates with at least one recess for receiving said hinge member, which recess is provided in the carrier structure. Structurally, in a variant, the stick is suitable for being hinged in omni-directional mobility to the carrier structure, such as via a ball joint whereby a member having a spherical bearing surface forms the hinge member and a cage of complementary shape forms the recess. Such an omni-directional hinge structure affords mobility to the stick so that it can tilt in directions assigned to respective flight commands, in particular in pitching and in roll, or indeed said hinge structure affords mobility to the stick so that it can move in rotation about its own axis.

In particular, with the stick being a cyclic stick for a rotorcraft, it is preferred to limit its mobility to two tilt orientations assigned to respective flight commands in pitching and in roll. With the stick being hinged via a ball joint to the carrier structure, its mobility in a pair of tilt orientations assigned to respective ones of flight commands is, for example, limited by corresponding slots for guiding the stick, which slots are provided on the carrier structure.

In another variant, the stick is suitable for being hinged to the carrier structure to pivot about one or more hinge axes in tilt directions assigned thereto in correspondence with dedicated flight commands, in pitching and in roll, in particular. Such hinge axes form hinge members for hinging the stick to the carrier structure, which structure is provided correspondingly with bearings for receiving said hinge axes.

The mechanism of the present invention is mainly recognizable in that the stick is arranged as a telescopic member operable to go between a normal-use retracted position and an emergency deployed position in which the grip is distant from the hinge axis compared with when it is in the retracted position. The telescopic member forming the stick is provided with locking means for locking it in the normal-use retracted position, which locking means prevent the stick from going into its deployed position in the absence of an emergency situation. The stick is equipped with deployment means for deploying it from its refracted position to its emergency deployed position. Unlocking of the locking means and use of the deployment means for deploying the stick into its deployed position depend on the assistance device being in a defective state.

More particularly, deactivation of the locking means so as to release the stick, and activation of the deployment means so as to deploy the stick into the deployed position are made to depend on it being detected that the assistance device is in a defective state. This dependence may be mechanical and/or electrical, or indeed it may be emergency flight procedure dependence whereby the pilot is authorized to unlock the stick and to cause it to go into the deployed position only in an emergency situation in which the assistance device has failed and/or is in a defective state.

While the aircraft is being flown using a normal flight protocol, the stick is kept locked in its normal-use retracted position by the locking means. The organization of the stick and its functions preclude it being used by the pilot in the deployed position in the absence of an emergency situation defined by operating failure and/or a defective state of the assistance device.

The defective state of the assistance device can be observed by the pilot directly by feel in view of the forces to be exerted on the stick in order to operate the flight controls and/or on the basis of detector means for defecting failure of the assistance device. In an emergency situation, the pilot can deactivate the locking means and bring the deployment means into use on the basis of manual control means and/or on the basis of a command generated by said detector means.

When the stick is in the retracted position, failure and/or a defective state of the assistance device constrain(s) the pilot to exert considerable and uncomfortable forces in order to operate the remote members from the stick. Unlocking the stick so that it goes into its deployed position procures an increase in the distance between the grip and the hinge axis, about which the stick is hinged to the carrier structure, compared with said distance when the stick is in the retracted position. This increase in distance procures an increased lever arm for the pilot, thereby enabling the pilot to operate the stick with sufficient comfort, despite a possible loss of comfort induced by the grip being raised relative to the armrest of the seat.

It should be noted that such an armrest is commonly of a height that is adjustable depending on the pilot sitting in the seat, and that if an emergency situation does not claim too much of the pilot's attention, the pilot can adjust the position of the armrest in order to increase comfort in manipulating the stick in the deployed position. The control forces that the pilot needs to exert on the stick in the deployed position are reasonable and enable the pilot to control the aircraft with precision despite the failure and/or a defective state of the assistance device.

The stick may be arranged as a bistable telescopic member, with it being kept in the retracted position by the locking means and in the deployed position by blocking means. Such an arrangement of the stick as a member that is bistable by being either in the refracted position or in the deployed position prevents the pilot from manipulating it with continuous variation in the length over which the telescopic member extends. Such prevention determines strict selective positioning of the stick so that it is either in the refracted position or in the deployed position. Blocking the stick in the deployed position procures control comfort for the pilot, who manipulates a stick that extends over a length that is stable both in the retracted position and in the deployed position.

The locking means and optionally the blocking means may be controlled manually by the pilot on detecting failure of the assistance device or on being warned by detector means of the emergency situation. Such manual control may, for example, be of the mechanical, electromechanical, or electrical type, using a control button or an analogous monostable or bistable member that can be actuated manually by the pilot so as to unlock at least one locking member.

The locking means and optionally the blocking means may also be electrically controlled. Such electrical control means are, for example, of the electromagnetic type or of the electromechanical type, including electrical means for activating the locking means, constituted for example, by said locking member. Activation of the electrical control means for controlling the locking means may be operated manually by the pilot on detecting failure of the assistance device or on being warned by detector means of the emergency situation, and/or activation may depend on the detector means for detecting failure of the assistance device.

At least the locking member is suitable for being a monostable member or a bistable member. In a variant, a plurality of locking members are assigned to keeping the stick respectively in the retracted position and in the deployed position. In another variant embodiment, the locking member is assigned to keeping the stick in each of its positions, namely both in its locked position and in its deployed position. When the stick is in the refracted position and/or in the deployed position, at least the locking means are, for example, in engagement between at least two components of the stick, which components are mounted to move relative to each other along the axis along which the stick extends so as to impart its telescopic nature to it. The locking member is operable by coming out of engagement with either one of at least two components of the stick so as to allow the deployment means to be brought into use to deploy the stick into its deployed position.

In a preferred embodiment, the deployment means are operable by motor-drive means that advantageously incorporate the locking means and optionally the blocking means. More particularly, activation of the motor-drive of the deployment means induces deactivation of the locking means and of the blocking means. In the absence of activation of the motor-drive means, the stick is kept strictly by the operating means at least in the retracted position, and preferably also in the deployed position. Such motor-drive means form the locking and/or blocking means which are advantageously combined means, by preventing operation of the deployment means in the absence of an activation command for activating said motor-drive means.

The deployment means are advantageously arranged as a mechanism comprising a nut and a bolt that are carried by respective ones of at least two components of the stick, which components are mounted to move relative to each other along the axis along which the stick extends so as to impart its telescopic nature to it. The mobility of the stick procuring the flight commands precludes mobility in rotation about its own axis, such mobility in rotation being reserved for deployment of the stick. In a preferred embodiment of simple structure, the bolt is provided along at least one zone in which a component of the stick extends, and said bolt co-operates with a nut carried by another component of the stick.

Such deployment means are preferably operable by motor-drive means, use of which depends on activator means. These activator means are suitable for being controlled manually by the pilot or for depending on detector means for detecting an operating failure of the assistance device, e.g. by using a force sensor. In an embodiment of the motor-drive means, said motor-drive means associate a rotor and a stator that are respectively in engagement either with the nut or with the bolt.

In a simple example of arrangement of the stick as a telescopic member, said stick comprises a rod forming one of its components that is mounted to move axially inside a sleeve forming another one of its components. The sleeve is secured to a hinge member that equips the stick and that is mounted to move about the hinge axis inside a complementary recess with which the carrier structure is provided. The bolt is advantageously provided along an axial zone of the rod that extends at its distal end, and the nut is carried by the sleeve while being operable in rotation, in particular via a rotor with which it is in engagement and that co-operates with a stator carried by the sleeve.

In a variant embodiment, the deployment means are elastically deformable means, e.g. constituted by a compression spring or a mass of elastically deformable material, that are placed under stress when the stick is in the retracted position, and that are spontaneously extendable for causing the stick to go into its deployed position as a result of it being released by the locking means.

In a variant embodiment, the locking means and optionally the blocking means are of the type acting by a pin between the sleeve and the rod. More particularly, said locking member is formed by a moving pin that is operable between a locking position in which the pin is jointly in engagement both with the sleeve and with the rod, and an unlocking position in which the pin is in engagement with the sleeve only or with the rod only.

BRIEF DESCRIPTION OF THE SEVERAL VIEWS OF THE DRAWINGS

Embodiments of the present invention are described below with reference to the figures of the accompanying drawings, in which:

FIG. 1 is a perspective view of an embodiment of a cyclic control stick for a rotorcraft, which stick is mounted on an armrest of a pilot's seat;

FIG. 2 is a perspective view of a control mechanism including the stick shown in FIG. 1, as extracted from the armrest.

DETAILED DESCRIPTION OF THE INVENTION

Figure 4:
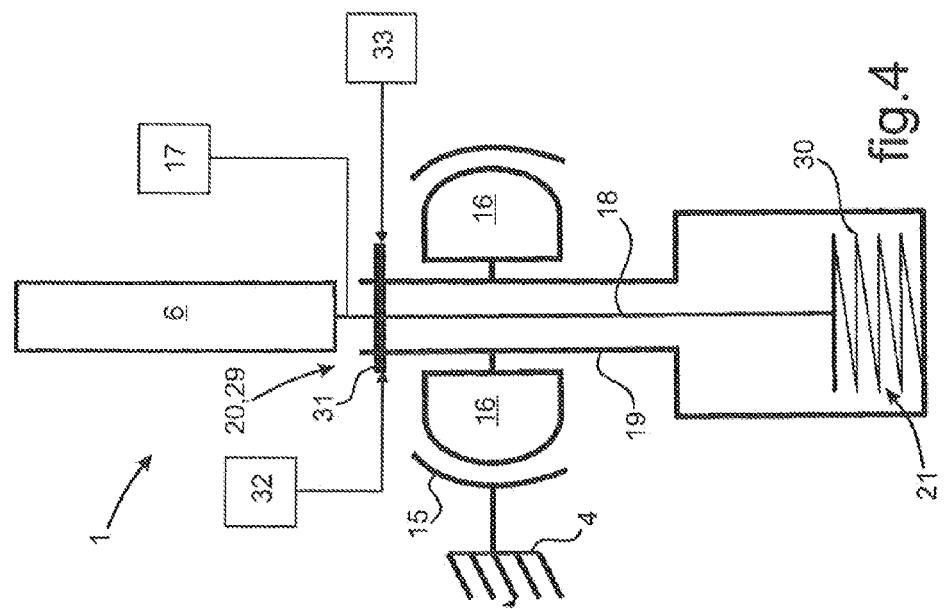
FIGS. 3 and 4 are diagrammatic axial section views of respective embodiments of a cyclic stick of the present invention.

FIGS. 1 and 2 show a cyclic control stick 1 making it possible to control the flight directions of an aircraft by changing the angle of incidence of the blades of a rotor with which it is equipped. The flight controls make it possible to incline the rotorcraft in pitching and in roll, with each of the flight commands being issued by manipulating the stick 1 to occupy respective ones of tilt orientations B1, B2. The stick 1 is equipped with mechanical transmission means 2, 3 arranged as rods and designed to be in engagement with remote members that are to be operated, so as to cause the desired change in the angle of incidence of the blades. For each of the tilt orientations B1, B2 of the stick 1, a respective transmission member 2, 3 is operated to match the flight command chosen by the pilot. The stick 1 is hinged to a carrier structure 4 that can be incorporated in an armrest 5 of a seat as shown in FIG. 1, and it is equipped at its proximal end with a grip 6 via which the pilot can take hold of the stick 1 so as to manipulate it by tilting it.

In FIG. 2, the stick 1 is hinged to the carrier structure 4 at its distal end via an omni-directional hinge arranged as a ball joint 7. The mobility of the stick 1 on the carrier structure 4 is limited to a pair of tilt orientations B1, B2 assigned to respective flight commands in pitching and in roll. This limitation of mobility is procured on basis of guiding the stick 1 to move in translation along slots 8, 9 that are provided in a cage 10 of the carrier structure 4. The cage 10 is provided between the ends of the stick 1, and as close as possible to its distal end, and said cage comprises a pair of anchor elements 11, 12 for anchoring the transmission members 2, 3 that are respectively assigned to them. These anchor elements 11, 12 are hinged to the carrier structure 4 to pivot about respective hinge axes 13, 14, and they are arranged to form bell cranks, having their ends engaged with respective ones of the transmission members 2, 3 and with the stick 1. The anchor elements 11, 12 incorporate the slots 8, 9 for guiding the stick 1, the slot 8, 9 in one anchor element 11, 12 procuring guidance for the stick 1 about the tilt orientation B1, B2 that corresponds to the other anchor element.

Figure 3:
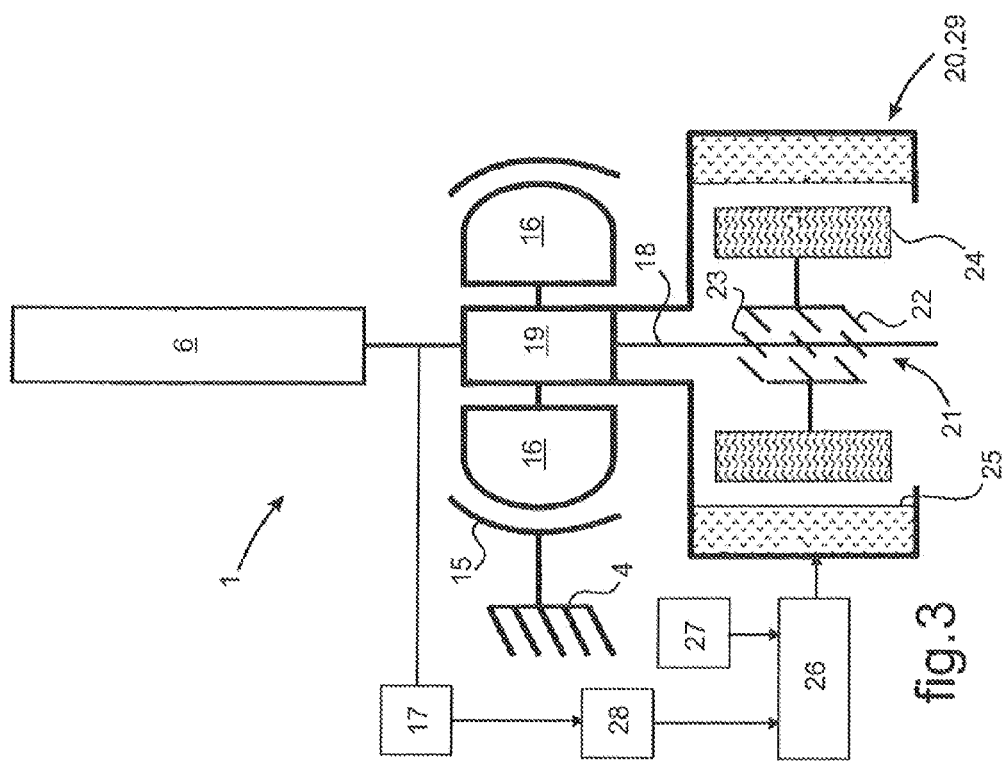

In FIGS. 3 and 4, a cyclic control stick 1 is hinged to a carrier structure 4, e.g. in a manner analogous to the manner in which it is hinged thereto in FIG. 2. The carrier structure 4 is provided with a recess 15 for receiving a hinge member 16 with which the stick 1 is provided for hinging it to the carrier structure 4. In the embodiment shown, the recess 15 and the hinge member 16 have spherical bearing surfaces procuring omni-directional mobility for the stick, which mobility may be limited in the manner described with reference to and shown in FIG. 2. The control stick 1 is associated with a force-amplifying assistance device 17 for mitigating the short lever arm that it procures. In the event of the assistance device 17 failing and/or being defective, the lever arm procured by the stick 1 is insufficient to offer satisfactory piloting comfort and/or to enable the rotorcraft to be controlled with precision. An emergency situation corresponding to such malfunctioning of the assistance device 17 is defined, as contrasted with normal use of the control stick 1 in the absence of such malfunctioning.

The control stick 1 is arranged as a telescopic member, made up of a rod 18 that is mounted to move axially in translation inside a guide sleeve 19. The concept of "telescopic member" is defined to mean that the control stick 1 can be extended from a refracted position to a deployed position. In the retracted position, the stick 1 is generally short, and in the deployed position, the general length over which the stick 1 extends is greater than its corresponding length in the retracted position. The lengths are measured from the grip 6 to the junction at which the stick 1 is hinged to the carrier structure 4.

The rod 18 is provided at its proximal end with the grip 6 and it co-operates with the sleeve 19 that is secured to the hinge member 16. The stick 1 is equipped with locking means 20 for locking it in the refracted position and with deployment means 21 for deploying it from its retracted position to its deployed position. The locking means 20 are normally activated in a situation in which the stick 1 is in normal use, so as to hold it in the refracted position. In an emergency situation, the locking means 20 are deactivated and the deployment means 21 are brought into use to cause the control stick 1 to go from its retracted position to its deployed position.

In FIG. 3 the deployment means 21 comprise a nut 22 that is carried by the sleeve 19 and that co-operates with a bolt 23 provided at least in part along the stick 1, and more particularly along the rod. The nut 22 is more particularly secured to a rotor 24 co-operating with a stator 25 for forming motor-drive means 24, 25 for operating the deployment means 21. Such motor-drive means 24, 25 are, in particular, organized as an electric motor mounted on the sleeve 19, operation of which is placed under the control of activator means 26. The motor-drive means 24, 25 are suitable for being installed in a chamber for receiving them, which chamber is included in the sleeve 19, or is provided in alignment therewith. These activator means 26 are suitable for being placed under the control of a manual control member 27 that can be operated by the pilot in the event that it is found that the assistance device 17 has failed and/or is in a defective state. In isolation or in combination, the activator means 26 are also suitable for being placed under the control of detector means 28 for detecting that the assistance device 17 has failed and/or is in a defective state.

Activation of the motor-drive means 24, 25 causes the rotor 24 to be driven in rotation, thereby driving the nut 22 so as to cause the rod 18 to move axially inside the sleeve 19, and deploying the stick 1. The motor-drive means 24, 25 incorporate the locking means 20, and advantageously blocking means 29 for blocking the stick 1 in the deployed position. In the absence of activation of the motor-drive means, and in particular of the electric motor, the nut 22 is held stationary, thereby preventing the rod 1 from moving axially inside the sleeve 19.

In FIG. 4, the deployment means 21 are of the elastic deformation type, and comprise elastically deformable means 30 that are axially interposed between the sleeve 19 and the rod 18. By way of example, such elastically deformable means 30 are formed by a compression spring as shown, or by any body suitable for deforming between a stressed position and a natural position. In the retracted position, the elastically deformable means are kept under stress between the sleeve 19 and the rod 18. Deactivating the locking means 20 allows the rod 18 to move axially, which rod then moves spontaneously by the elastically deformable means 30 being released and tending to resume their natural shape.

The locking means 20 are of the type having a pin between the sleeve 19 and the rod 18. In the locking position, a pin 31 engages both the rod 18 and the sleeve 19, so as to hold the stick 1 in the retracted position. In the unlocking position, the pin 31 is released either from the rod 18 or from the sleeve 19 so as to allow the rod 18 to move axially inside the sleeve 19. The locking means 20 are suitable for being used to form blocking means 29 for blocking the stick 1 in the deployed position, once the pin 31 is put back into engagement with both the rod 18 and the sleeve 19. The pin 31 is suitable for being operated manually by the pilot by means of a control button 32, or via motor-drive means 33.

What is claimed is:

1. A control mechanism for controlling at least one flight direction of an aircraft, said control mechanism comprising a control stick that is axially long, that is mounted on a carrier structure to pivot about at least one hinge axis and that is arranged at its proximal end as a grip, the stick being in engagement with at least one remote mechanical transmission member that is coupled to a remote member to be operated, and being equipped with at least one force-amplifying assistance device, wherein the stick is arranged as a telescopic member provided with locking means for locking it in a normal-use retracted position, and is equipped with deployment means for deploying it from the retracted position to an emergency deployed position, unlocking of the locking means and use of the deployment means for deploying the stick into its deployed position depending on the assistance device being defective.

2. A control mechanism according to claim 1, wherein the stick is arranged as a bistable telescopic member, with it being kept in the retracted position by the locking means and in the deployed position by blocking means.

3. A control mechanism according to claim 1, wherein the deployment means are operable by motor-drive means incorporating the locking means and optionally the blocking means.

4. A control mechanism according to claim 1, wherein the deployment means are operable by motor-drive means incorporating the blocking means.

5. A control mechanism according to claim 1, wherein the deployment means are arranged as a mechanism comprising a nut and a bolt that are respectively carried by either one of at least two components of the stick, which components are mounted to move relative to each other along the axis along which the stick extends.

6. A control mechanism according to claim 5, wherein the deployment means are operable by motor-drive means, the use of which is placed under the control of activator means, the motor-drive means associating a rotor and a stator that are respectively in engagement either with the nut or with the bolt.

7. A control mechanism according to claim 6, wherein the activator means are controlled manually.

8. A control mechanism according to claim 6, wherein the activator means are placed under the control of detector means for detecting malfunctioning of the assistance device.

9. A control mechanism according to claim 1, wherein the stick comprises a rod mounted to move axially inside a sleeve secured to a hinge member, the hinge member equipping the stick and being mounted to move about the hinge axis inside a recess with which the carrier structure is provided.

10. A control mechanism according to claim 1, wherein the deployment means are elastically deformable means that are placed under stress when the stick is in the refracted position, and that are spontaneously extendable for causing the stick to go into its deployed position.

11. A control mechanism according to claim 9, wherein the locking means and/or blocking means are of the type acting by means of a pin between the sleeve and the rod.

\* \* \* \* \*